(12) United States Patent
Masuda

(10) Patent No.: US 7,978,257 B2
(45) Date of Patent: Jul. 12, 2011

(54) MULTIPLE LENS IMAGING APPARATUSES, AND METHODS AND PROGRAMS FOR SETTING EXPOSURE OF MULTIPLE LENS IMAGING APPARATUSES

(75) Inventor: Tomonori Masuda, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 642 days.

(21) Appl. No.: 11/935,693

(22) Filed: Nov. 6, 2007

(65) Prior Publication Data

US 2008/0106634 A1 May 8, 2008

(30) Foreign Application Priority Data

Nov. 7, 2006 (JP) ................................. 2006-301383

(51) Int. Cl.
*H04N 5/235* (2006.01)
(52) U.S. Cl. ...................................................... 348/362
(58) Field of Classification Search .................. 348/42, 348/139, 335, 333.09, 362–366
See application file for complete search history.

(56) References Cited

U.S. PATENT DOCUMENTS

| | | | | |
|---|---|---|---|---|
| 5,650,944 A * | 7/1997 | Kise | ............................... | 700/304 |
| 6,215,961 B1 * | 4/2001 | Mukai et al. | .................. | 396/100 |
| 6,721,044 B2 * | 4/2004 | Fukazawa et al. | ............ | 356/222 |
| 7,092,625 B2 * | 8/2006 | Nonaka | ........................... | 396/61 |
| 7,259,784 B2 * | 8/2007 | Cutler | ......................... | 348/223.1 |
| 7,463,296 B2 * | 12/2008 | Sun et al. | ....................... | 348/254 |
| 7,655,894 B2 * | 2/2010 | Schofield et al. | ........... | 250/208.1 |
| 2006/0013578 A1 * | 1/2006 | Sato et al. | ...................... | 396/100 |
| 2006/0227209 A1 | 10/2006 | Takayama | | |
| 2007/0103577 A1 * | 5/2007 | Misawa et al. | ........... | 348/333.01 |

FOREIGN PATENT DOCUMENTS

| | | |
|---|---|---|
| JP | 8029895 A | 2/1996 |
| JP | 9084056 A | 3/1997 |
| JP | 2000341719 A | 12/2000 |
| JP | 2006-295506 A | 10/2006 |

* cited by examiner

*Primary Examiner* — Nhan T Tran
*Assistant Examiner* — Trung Diep
(74) *Attorney, Agent, or Firm* — Sughrue Mion, PLLC

(57) ABSTRACT

When an exposure value calculated according to a result of photometric measurement for predetermined main imaging units among a plurality of imaging units is used for setting exposure of the main imaging units and sub-imaging units other than the main imaging units, judgment is carried out as to whether an image or images obtained in photography with the sub-imaging units by setting the exposure thereof according to the exposure value is/are saturated. In the case where a result of the judgment is affirmative, any one of the sub-imaging units having obtained the saturated image or images is designated as new main imaging units. The exposure value is calculated newly, and the exposure is set for the new main imaging units and for new sub-imaging units other than the new main imaging units.

10 Claims, 12 Drawing Sheets

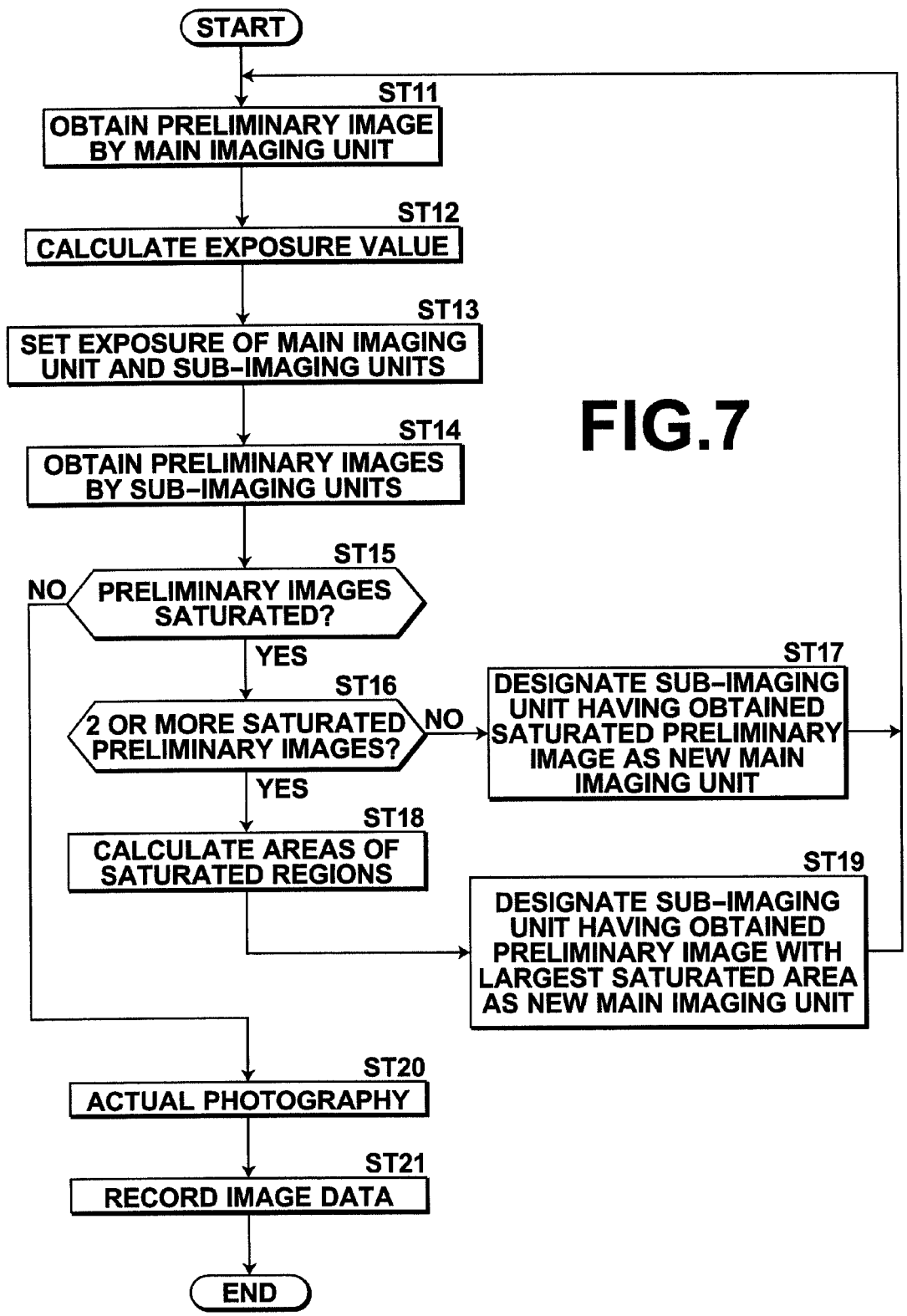

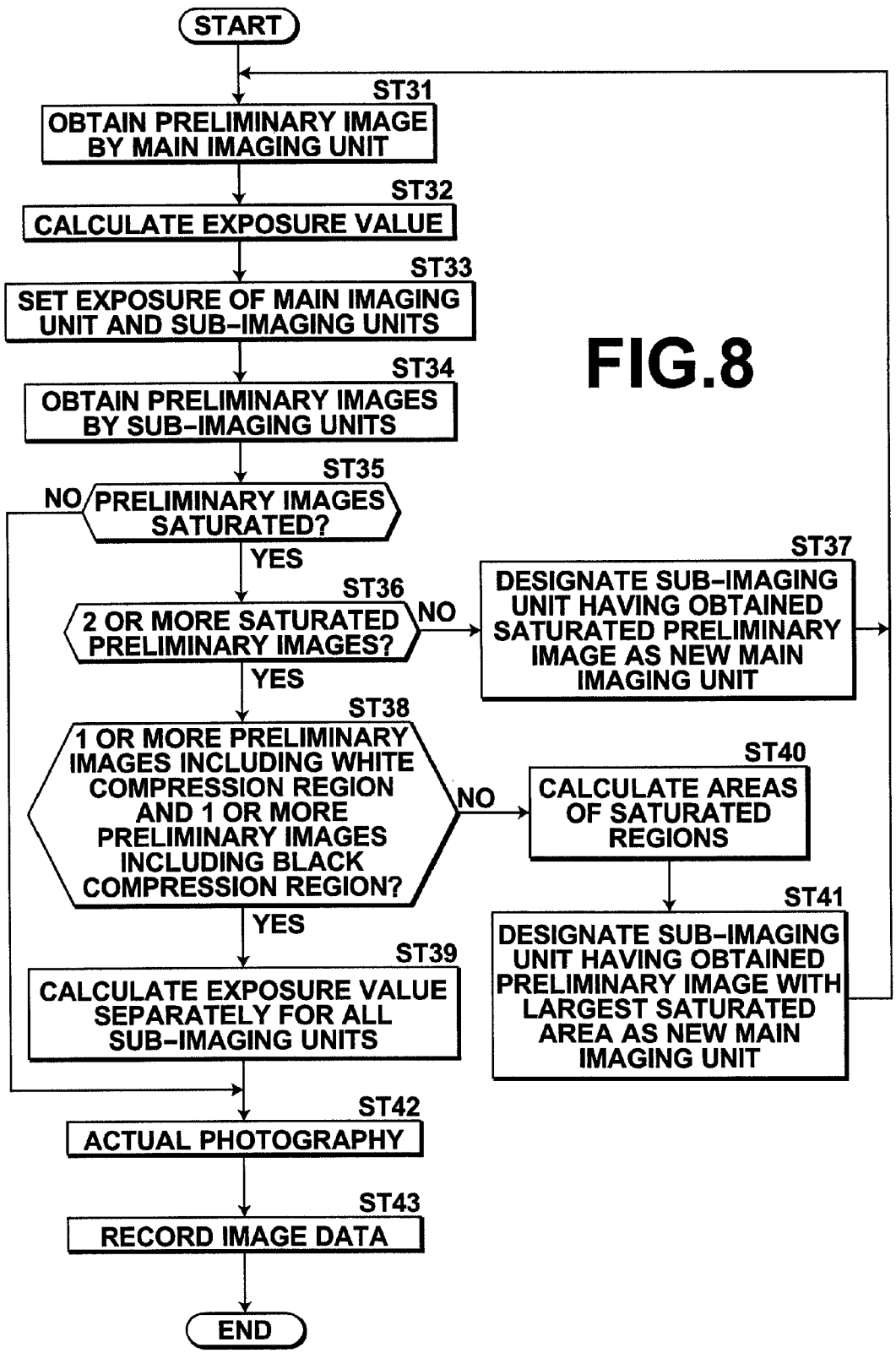

MULTIPLE LENS IMAGING APPARATUSES, AND METHODS AND PROGRAMS FOR SETTING EXPOSURE OF MULTIPLE LENS IMAGING APPARATUSES

BACKGROUND OF THE INVENTION

1. Field of the Invention

The present invention relates to multiple lens imaging apparatuses each having a plurality of imaging units and to methods for setting exposure of the multiple lens imaging apparatuses. The present invention also relates to programs that cause a computer to execute the methods.

2. Description of the Related Art

Various kinds of multiple lens imaging apparatuses that enable three-dimensional (3D) imaging or panoramic imaging have been proposed as multiple lens imaging apparatuses each having multiple imaging units. In such multiple lens imaging apparatuses, identical imaging units are located to the right and left of each of the apparatuses, and images obtained simultaneously by the respective imaging units are subjected to composite processing to generate a stereo image realizing stereovision or a panoramic image.

Meanwhile, in each of multiple lens imaging apparatuses, each of imaging units has an iris and an iris adjustment mechanism that are controlled independently from the other imaging unit or units. Therefore, an amount of light is different between images from the respective imaging units, and a stereo image or a panoramic image generated from the images is substantially uncomfortable to view.

For this reason, a method of determining one exposure value based on comparison of exposure values between imaging units and a method of determining one exposure value based on comparison of image data obtained by imaging units have been proposed (see Japanese Unexamined Patent Publication Nos. 8(1996)-029895 and 9(1997)-084056, respectively). In addition, a method has been proposed wherein luminance data of an image obtained by a specific one of imaging units are compared with reference data and exposure of an imaging unit other than the specific imaging unit is adjusted based on a result of the comparison (see Japanese Unexamined Patent Publication No. 2000-341719).

However, in the methods described in Japanese Unexamined Patent Publication Nos. 8(1996)-029895 and 9(1997)-084056, each of the imaging units needs to calculate the exposure value independently. Therefore, the configuration of a corresponding multiple lens imaging apparatus becomes complex, and the apparatus becomes larger in size. In the method described in Japanese Unexamined Patent Publication No. 2000-341719, the exposure value set for one of the imaging units is used for the other imaging unit. Therefore, a corresponding apparatus can be prevented from becoming large in size. However, the calculated exposure value is not necessarily appropriate for the other imaging unit. Therefore, an image obtained by the other imaging unit may have a saturated area such as an area where white compression or black compression is observed.

SUMMARY OF THE INVENTION

The present invention has been conceived based on consideration of the above circumstances, and an object of the present invention is to set exposure of a multiple lens imaging apparatus to avoid generation of a saturated image as much as possible.

A first multiple lens imaging apparatus of the present invention is a multiple lens imaging apparatus having a plurality of imaging unit for obtaining images by photography, and the apparatus comprises:

exposure setting unit for using an exposure value calculated according to a result of photometric measurement for predetermined main imaging unit among the plurality of imaging unit, to set exposure of the main imaging unit and sub-imaging unit other than the main imaging unit. In the case where an image or images obtained in photography with the sub-imaging unit by setting the exposure thereof according to the exposure value is/are saturated, the exposure setting unit designates any one of the sub-imaging unit having obtained the saturated image or images as new main imaging unit. The exposure setting unit then newly calculates the exposure value and sets the exposure of the new main imaging unit and new sub-imaging unit other than the new main imaging unit.

In this manner, the exposure value that will not cause image saturation can be calculated for the imaging unit which has/have obtained the saturated image or images, and image saturation can be prevented for at least the imaging unit designated as the new main imaging unit.

"Image saturation" refers to a state wherein a portion or the entire of an image is too bright or too dark so that no gradation can be expressed therein. More specifically, the state of "image saturation" refers to a state wherein white compression is observed in an image due to luminance thereof becomes a predetermined threshold value or higher on a high luminance side, or a state wherein black compression occurs in an image due to luminance thereof becomes a predetermined threshold value or lower on a low luminance side, or a state wherein at least one of color signals comprising an image becomes a predetermined threshold value or larger or a predetermined threshold value or smaller.

In the first multiple lens imaging apparatus of the present invention, in the case where the number of the sub-imaging unit having obtained the saturated image or images is one, the exposure setting unit may designate the sub-imaging unit as the new main imaging unit.

In addition, in the case where the number of the sub-imaging unit having obtained the saturated image or images is larger than one in the first multiple lens imaging apparatus of the present invention, the exposure setting unit may designate the sub-imaging unit that has obtained the image having a largest saturated region as the new main imaging unit.

A second multiple lens imaging apparatus of the present invention is a multiple lens imaging apparatus having a plurality of imaging unit for obtaining images by photography, and the apparatus comprises:

exposure setting unit for using an exposure value calculated according to a result of photometric measurement for predetermined main imaging unit among the plurality of imaging unit, to set exposure of the main imaging unit and sub-imaging unit other than the main imaging unit. In the case where the number of the sub-imaging unit having obtained saturated images in photography by setting the exposure thereof according to the exposure value is larger than one, if the saturated images include an image saturated on a high luminance side and an image saturated on a low luminance side, the exposure setting unit calculates the exposure value separately for the sub-imaging unit having obtained the image saturated on the high luminance side and for the sub-imaging unit having obtained the image saturated on the low luminance side.

In this manner, the exposure value can be calculated so as not to cause image saturation, for the imaging unit having obtained the image saturated on the high luminance side and for the imaging unit having obtained the image saturated on the low luminance side. Therefore, image saturation can be prevented for at least the imaging unit having obtained the saturated images.

A third multiple lens imaging apparatus of the present invention is a multiple lens imaging apparatus having a plurality of imaging unit for obtaining images by photography, and the apparatus comprises:

exposure setting unit for using an exposure value calculated according to a result of photometric measurement for predetermined main imaging unit among the plurality of imaging unit, to set exposure of the main imaging unit and sub-imaging unit other than the main imaging unit. In the case where an image or images obtained in photography with the sub-imaging unit by setting the exposure thereof according to the exposure value is/are saturated, the exposure setting unit carries out judgment as to whether a size of a saturated region therein is equal to or larger than a predetermined threshold value. In the case where a result of the judgment is affirmative, the exposure setting unit calculates the exposure value separately for the sub-imaging unit having obtained the corresponding saturated image. In the case where the result of the judgment is negative, the exposure setting unit designates any one of the sub-imaging unit having obtained the saturated image_or images as new main imaging unit. The exposure setting unit newly calculates the exposure value and sets the exposure of the new main imaging unit and new sub-imaging unit other than the new main imaging unit.

If the exposure value is calculated by designating as the new main imaging unit the imaging unit that has obtained the image having the saturated region whose size is equal to or larger than the predetermined threshold value, an amount of change in the exposure becomes large. Therefore, an image obtained by the new sub-imaging unit has a higher possibility of image saturation. According to the third multiple lens imaging apparatus of the present invention, the exposure value is calculated separately for the sub-imaging unit that has obtained the image having the saturated region whose size is equal to or larger than the predetermined threshold value. Therefore, the exposure value can be calculated so as not to cause image saturation, and image saturation can be prevented for at least the imaging unit that has obtained the image having the saturated region whose size is equal to or larger than the predetermined threshold value.

A fourth multiple lens imaging apparatus of the present invention is a multiple lens imaging apparatus having a plurality of imaging unit for obtaining images by photography, and the apparatus comprises:

exposure setting unit for using an exposure value calculated from a result of photometric measurement according to a predetermined photometric method for predetermined main imaging unit among the plurality of imaging unit, to set exposure of the main imaging unit and sub-imaging unit other than the main imaging unit. In the case where an image or images obtained in photography with the sub-imaging unit by setting the exposure thereof according to the exposure value is/are saturated, the exposure setting unit calculates the exposure value again by changing the photometric method for the main imaging unit.

In this manner, the exposure value can be calculated according to a different photometric method. Therefore, by obtaining an image or images after setting the exposure of the sub-imaging unit again according to the re-calculated exposure value, judgment can be made again as to whether the image or images is/are saturated.

A fifth multiple lens imaging apparatus of the present invention is a multiple lens imaging apparatus having a plurality of imaging unit for obtaining images by photography, and the apparatus comprises:

exposure setting unit for using an exposure value calculated from a result of photometric measurement according to a predetermined photometric method for predetermined main imaging unit among the plurality of imaging unit, to set exposure of the main imaging unit and sub-imaging unit other than the main imaging unit. In the case where an image or images obtained in photography with the sub-imaging unit by setting the exposure thereof according to the exposure value is/are saturated, the exposure setting unit designates any one of the sub-imaging unit having obtained the saturated image or images as new main imaging unit, and calculates a new exposure value based on a result of photometric measurement for the new main imaging unit according to a photometric method that is different from the predetermined photometric method.

In this manner, the exposure value can be calculated according to a different photometric method for the new main imaging unit. Therefore, an image or images can be obtained by setting again the exposure of new sub-imaging unit according to the re-calculated exposure value, and judgment as to whether the image or images is/are saturated can be carried out again.

In the first to fifth multiple lens imaging apparatuses of the present invention, the exposure setting unit may carry out judgment as to whether a saturated region in each of the images obtained by the plurality of imaging unit is within a predetermined region therein. In the case where a result of the judgment is affirmative, the exposure setting unit judges that the corresponding image is saturated.

In the first to fifth multiple lens imaging apparatuses of the present invention, the exposure setting unit may carry out the judgment as to whether the image or images is/are saturated, in a predetermined region in each of the images obtained by the plurality of imaging unit.

Each of the first to fifth multiple lens imaging apparatuses of the present invention may comprise a plurality of auxiliary light sources corresponding respectively to the plurality of imaging unit for emitting auxiliary lights to directions of photography by the corresponding imaging unit. In this case, each of the apparatuses may further comprise:

lighting control unit for controlling, in the case where the image or images obtained in photography with the sub-imaging unit by setting the exposure thereof according to the exposure value is/are saturated, lighting on and off the auxiliary light sources depending on whether the image or each of the images is saturated on a high luminance side or on a low luminance side.

More specifically, in the case where the image obtained by any one of the sub-imaging unit is saturated on a high luminance side, the lighting control unit turns on the auxiliary light source corresponding to the main imaging unit so as to cause the image obtained by the main imaging unit to be brighter. In the case where the image obtained by any one of the sub-imaging unit is saturated on a low luminance side, the lighting control unit turns on the auxiliary light source of the corresponding sub-imaging unit so as to cause the image obtained by the sub-imaging unit to become brighter. In the case where the images obtained by more than one of the sub-imaging unit are saturated on the low luminance side, the lighting control unit turns on the auxiliary light sources for all the sub-imaging unit having obtained the saturated images.

In this manner, a difference in brightness of a subject photographed by the main imaging unit and the sub-imaging unit can be reduced. Therefore, the exposure can be set more easily.

A first exposure setting method of the present invention is an exposure setting method for a multiple lens imaging apparatus having a plurality of imaging unit for obtaining images by photography, and the method comprises the steps of:

carrying out judgment, at the time of using an exposure value calculated according to a result of photometric measurement for predetermined main imaging unit among the plurality of imaging unit to set exposure of the main imaging unit and sub-imaging unit other than the main imaging unit, as to whether an image or images obtained in photography with the sub-imaging unit by setting the exposure thereof according to the exposure value is/are saturated;

designating any one of the sub-imaging unit having obtained the saturated image or images as new main imaging unit in the case where a result of the judgment is affirmative; and newly carrying out calculation of the exposure value and setting of the exposure of the new main imaging unit and new sub-imaging unit other than the new main imaging unit.

A second exposure setting method of the present invention is an exposure setting method for a multiple lens imaging apparatus having a plurality of imaging unit for obtaining images by photography, and the method comprises the steps of:

carrying out judgment, at the time of using an exposure value calculated according to a result of photometric measurement for predetermined main imaging unit among the plurality of imaging unit to set exposure of the main imaging unit and sub-imaging unit other than the main imaging unit, as to whether the number of the sub-imaging unit having obtained saturated images in photography by setting the exposure thereof according to the exposure value is larger than one; and, in the case where a result of the judgment is affirmative and the saturated images include an image saturated on a high luminance side and an image saturated on a low luminance side, calculating the exposure value separately for the sub-imaging unit having obtained the image saturated on the high luminance side and for the sub-imaging unit having obtained the image saturated on the low luminance side.

A third exposure setting method of the present invention is an exposure setting method for a multiple lens imaging apparatus having a plurality of imaging unit for obtaining images by photography, and the method comprises the steps of:

carrying out judgment, at the time of using an exposure value calculated according to a result of photometric measurement for predetermined main imaging unit among the plurality of imaging unit to set exposure of the main imaging unit and sub-imaging unit other than the main imaging unit, as to whether an image or images obtained in photography with the sub-imaging unit by setting the exposure thereof according to the exposure value is/are saturated;

carrying out judgment, in the case where a result of the immediately preceding judgment is affirmative, as to whether a size of a saturated region therein is equal to or larger than a predetermined threshold value;

calculating, in the case where a result of the immediately preceding judgment is affirmative, the exposure value separately for the sub-imaging unit having obtained the corresponding saturated image;

designating, in the case where the result of the immediately preceding judgment is negative, any one of the sub-imaging unit having obtained the saturated image or images as new main imaging unit; and newly carrying out calculation of the exposure value and setting of the exposure of the new main imaging unit and new sub-imaging unit other than the new main imaging unit.

A fourth exposure setting method of the present invention is an exposure setting method for a multiple lens imaging apparatus having a plurality of imaging unit for obtaining images by photography, and the method comprises the steps of:

carrying out judgment, at the time of using an exposure value calculated from a result of photometric measurement according to a predetermined photometric method for predetermined main imaging unit among the plurality of imaging unit to set exposure of the main imaging unit and sub-imaging unit other than the main imaging unit, as to whether an image or images obtained in photography with the sub-imaging unit by setting the exposure thereof according to the exposure value is/are saturated; and calculating the exposure value again by changing the photometric method for the main imaging unit in the case where a result of the judgment is affirmative.

A fifth exposure setting method of the present invention is an exposure setting method for a multiple lens imaging apparatus having a plurality of imaging unit for obtaining images by photography, and the method comprises the steps of:

carrying out judgment, at the time of using an exposure value calculated from a result of photometric measurement according to a predetermined photometric method for predetermined main imaging unit among the plurality of imaging unit to set exposure of the main imaging unit and sub-imaging unit other than the main imaging unit, as to whether an image or images obtained in photography with the sub-imaging unit by setting the exposure thereof according to the exposure value is/are saturated; and designating, in the case where a result of the judgment is affirmative, any one of the sub-imaging unit having obtained the saturated image or images as new main imaging unit and calculating a new exposure value based on a result of photometric measurement for the new main imaging unit according to a photometric method that is different from the predetermined photometric method.

The first to fifth exposure setting methods of the present invention may be provided as programs that cause a computer to execute the methods.

BRIEF DESCRIPTION OF THE DRAWINGS

FIG. 7 is a flow chart showing exposure setting processing in the second embodiment;

FIG. 8 is a flow chart showing exposure setting processing in a third embodiment;

DESCRIPTION OF THE PREFERRED EMBODIMENTS

Figure 1:
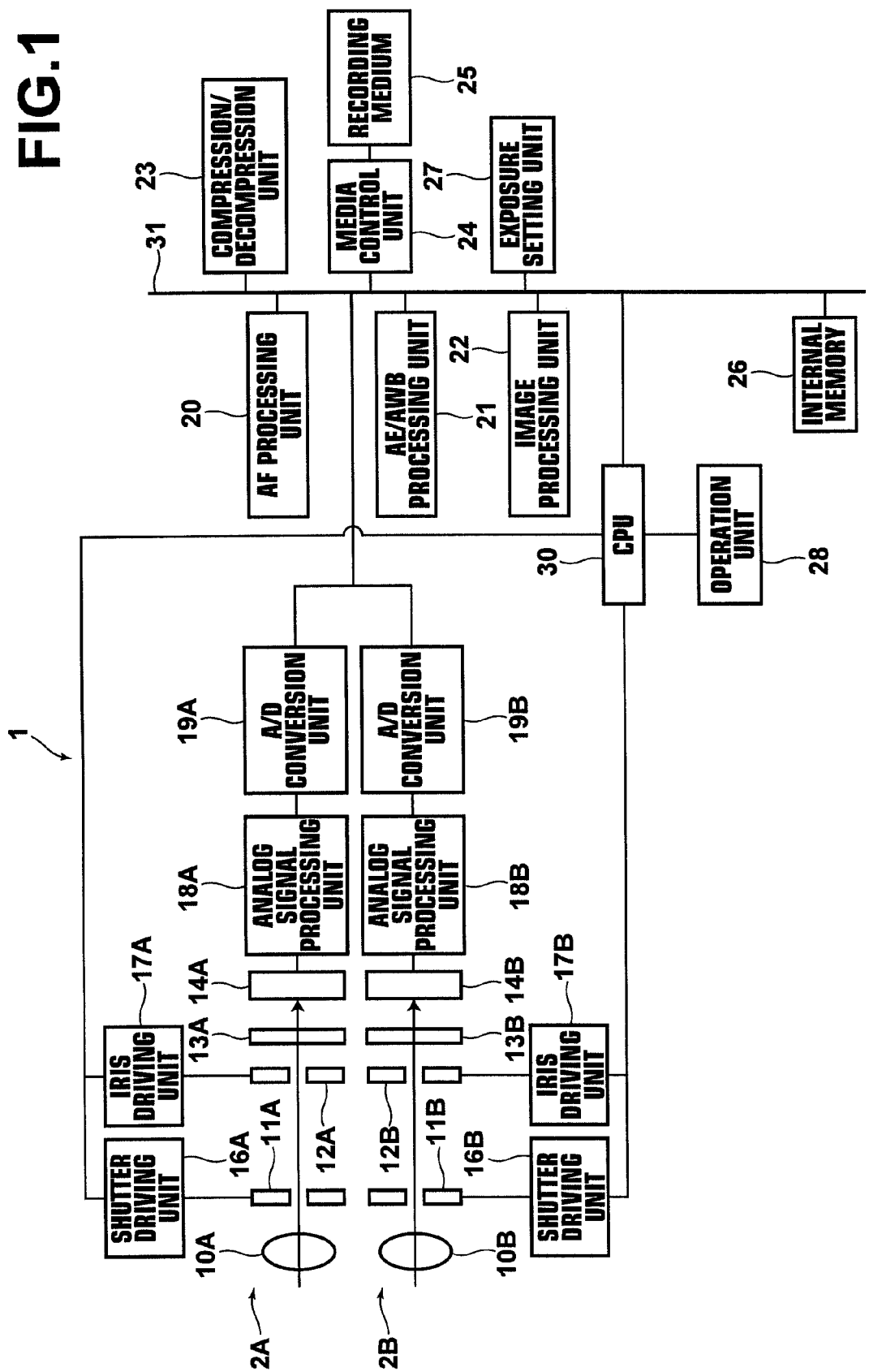
FIG. 1 shows the configuration of a multiple lens imaging apparatus of a first embodiment of the present invention.

Hereinafter, embodiments of the present invention will be described with reference to the accompanying drawings. FIG. 1 shows the configuration of a multiple lens imaging apparatus of a first embodiment of the present invention. A multiple lens imaging apparatus 1 shown in FIG. 1 is used for generating a stereo image after obtaining two images having a parallax by photography of the same subject with two spaced imaging units 2A and 2B. Alternatively, the multiple lens imaging apparatus may be used for generating a panoramic image from images obtained by the two imaging units 2A and 2B located in parallel to each other. The images obtained by the two imaging units 2A and 2B may be still images or moving images. In the embodiments described below, the images refer to still images.

The imaging units 2A and 2B comprise lenses 10A and 10B, shutters 11A and 11B, irises 12A and 12B, optical filters 13A and 13B, CCDs 14A and 14B, shutter driving units 16A and 16B, iris driving units 17A and 17B, analog signal processing units 18A and 18B, and A/D conversion units 19A and 19B.

The shutters 11A and 11B are mechanical shutters, and driven by the shutter driving units 16A and 16B each comprising a motor and a motor driver. The shutter driving units 16A and 16B control opening and closing of the shutters 11A and 11B based on a signal generated by pressing a shutter release button and shutter speed data outputted from an AE/AWB processing unit 21 that will be described later.

The irises 12A and 12B are driven by the iris driving units 17A and 17B each comprising a motor and a motor driver. Each of the iris driving units 17A and 17B adjusts an iris diameter based on iris value data outputted from the AE/AWB processing unit 21.

Each of the optical filters 13A and 13B is formed by RGB color filters arranged regularly.

Each of the CCDs 14A and 14B has a photoelectric surface in which a plurality of light receiving elements are laid out two dimensionally. A light from the subject forms an image on the photoelectric surface and subjected to photoelectric conversion to obtain an analog image signal.

The analog image signal from each of the CCDs 14A and 14B is inputted to a corresponding one of the analog signal processing units 18A and 18B. Each of the analog signal processing units 18A and 18B comprises a correlated double sampling circuit (CDS) that removes noise from the analog signal, and an automatic gain controller (AGC) that adjusts a gain of the analog signal.

The analog signal processed by each of the analog signal processing units 18A and 18B is inputted to a corresponding one of the A/D conversion units 19A and 19B, and converted into a digital signal. Image data converted into the digital signal are CCD-RAW data having RGB density values for each of pixels.

The multiple lens imaging apparatus 1 also has an AF processing unit 20, the AE/AWB processing unit 21, an image processing unit 22, a compression/decompression unit 23, a media control unit 24, an internal memory 26, an exposure setting unit 27, an operation unit 28, and a CPU 30.

The AF processing unit 20 and the AE/AWB processing unit 21 determine photography conditions based on a preliminary image. The preliminary image is an image represented by image data obtained as a result of preliminary photography with each of the CCDs 14A and 14B instructed by the CPU 30 that has detected a half-press signal generated by half-press of the shutter release button.

The AF processing unit 20 carries out AF processing by detecting a focal position based on the preliminary image. As a method of detecting the focal position, a passive method may be adopted, for example. A passive method detects an in-focus position by using a characteristic that an image has high contrast in a state of in-focus on a desired subject.

The AE/AWB processing unit 21 carries out measurement of luminance of the subject (photometric measurement) based on the preliminary image, and determines an iris value, a shutter speed, and the like based on the measured luminance. The AE/AWB processing unit 21 calculates the iris value data and the shutter speed data as an exposure value (AE processing), and automatically adjusts white balance at the time of photography (AWB processing).

The image processing unit 22 carries out image quality enhancement processing such as gradation correction, sharpness correction, and color correction on data of a final image. The image processing unit 22 also carries out YC processing to convert the CCD-RAW data into YC data comprising Y data as a luminance signal, Cb data as a blue color difference signal, and Cr data as a red color difference signal. The final image is an image represented by image data inputted from each of the CCDs 14A and 14B, in actual photography carried out by full press of the shutter release button.

The compression/decompression unit 23 carries out compression processing in a format such as JPEG or motion JPEG on the final image data having been subjected to the quality enhancement processing and the conversion by the image processing unit 22, and generates an image file. A tag storing accompanying information such as time and date of photography is added to the image file according to the Exif format or the like.

The media control unit 24 controls image-file reading and writing by accessing a recording medium 25.

The internal memory 26 stores various kinds of constants set in the multiple lens imaging apparatus 1, a program executed by the CPU 30, and the like.

The exposure setting unit 27 sets exposure of the two imaging units 2A and 2B. More specifically, the exposure setting unit 27 predetermines the imaging unit 2A as a main imaging unit among the imaging units 2A and 2B, and calculates the exposure value based on the preliminary image obtained by the main imaging unit. The exposure setting unit 27 basically sets the exposure of the imaging unit 2B (a sub-imaging unit) and the main imaging unit 2A, based on the calculated exposure value. Details of this processing by the exposure setting unit 27 will be described later.

The CPU 30 controls each of the units of the multiple lens imaging apparatus 1 according to a signal from each of the processing units such as the AE/AWB processing unit 21 and the operation unit 28 including the shutter release button.

A data bus 31 is connected to the A/D conversion units 19A and 19B, the AF processing unit 20, the AE/AWB processing unit 21, the image processing unit 22, the compression/decompression unit 23, the media control unit 24, the internal memory 26, the exposure setting unit 27, and the CPU 30, for exchange of the digital image data and the like.

Figure 2:
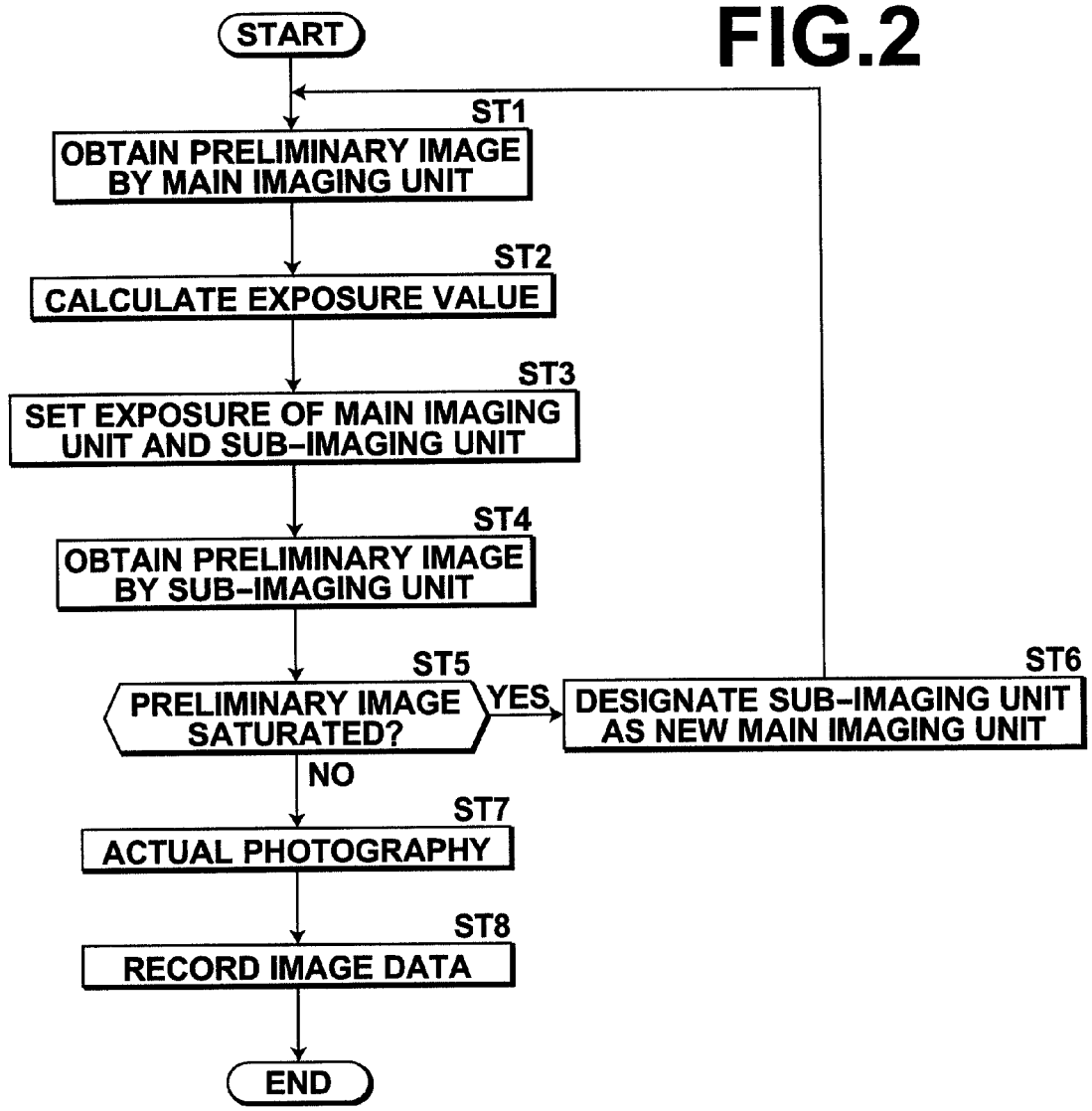
FIG. 2 is a flow chart showing exposure setting processing in the first embodiment.

The exposure setting processing carried out by the exposure setting unit 27 will be described next. FIG. 2 is a flow chart showing the exposure setting processing in the first embodiment. When a photographer instructs the start of photography by using the operation unit 28, the CPU 30 starts the processing. The exposure setting unit 27 instructs the main imaging unit 2A to obtain the preliminary image, and the main imaging unit 2A obtains the preliminary image (Step ST1). The AE/AWB processing unit 21 carries out the AE processing by using the preliminary image, and calculates the exposure value (Step ST2). The exposure setting unit 27 sets the exposure of the main imaging unit 2A and the sub-imaging unit 2B, based on the calculated exposure value (Step ST3).

The exposure setting unit 27 then instructs the sub-imaging unit 2B whose exposure has been set to obtain the preliminary image, and the sub-imaging unit 2B obtains the preliminary image (Step ST4). The exposure setting unit 27 judges whether the preliminary image is saturated (Step ST5). More specifically, the exposure setting unit 27 judges whether the preliminary image includes a region wherein white compression and/or black compression is observed.

For judgment of white compression, the exposure setting unit 27 calculates luminance values for all the pixels in the preliminary image, and judges that the preliminary image includes a region wherein white compression is observed (hereinafter referred to as a white compression region) in the case where any portion of the calculated luminance values is equal to or larger than a threshold value Th1 determined with reference to a highest luminance value that the preliminary image can take. The threshold value Th1 is a value that is approximately 97% of the highest luminance value. For example, the threshold value Th1 is 247 in the case where the highest luminance value is 8-bit (that is, 255).

For judgment of black compression, the exposure setting unit 27 calculates the luminance values for all the pixels in the preliminary image, and judges that the preliminary image includes a region wherein black compression is observed (hereinafter referred to as a black compression region) in the case where any portion of the calculated luminance values is equal to or smaller than a threshold value Th2 determined with reference to a lowest luminance value that the preliminary image can take. The threshold value Th2 is a value that is approximately 3% of the highest luminance value. For example, the threshold value Th2 is 7 in the case where the highest luminance value is 8-bit (that is, 255).

If a result of the judgment at Step ST5 is affirmative, the exposure setting unit 27 designates the sub-imaging unit 2B as a new main imaging unit (Step ST6), and the processing returns to Step ST1. In this manner, the procedures after Step ST1 are repeated by using the new main imaging unit 2B.

In the case where the result of the judgment at Step ST5 is negative, the exposure setting unit 27 instructs the imaging units 2A and 2B to carry out actual photography by setting the exposure according to the exposure value having been calculated. In response, the imaging units 2A and 2B carry out the actual photography (Step ST7). Two image data sets obtained in the actual photography are recorded in the recording medium 25 (Step ST8) to end the processing.

Figure 3:
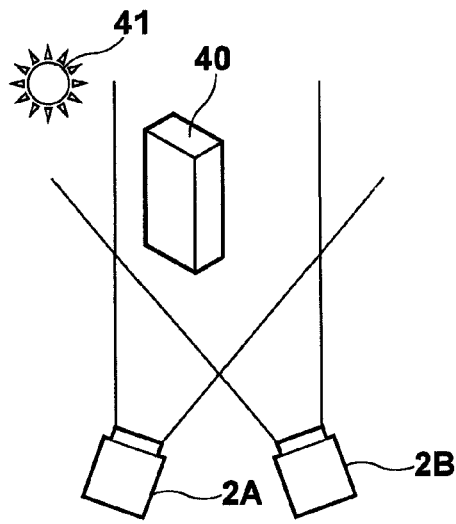
FIG. 3 shows a situation of photography by imaging units.
Figure 4A:
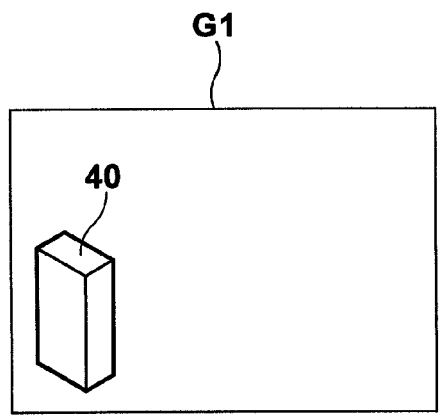
FIGS. 4A and 4B show images obtained by the imaging units.
Figure 4B:
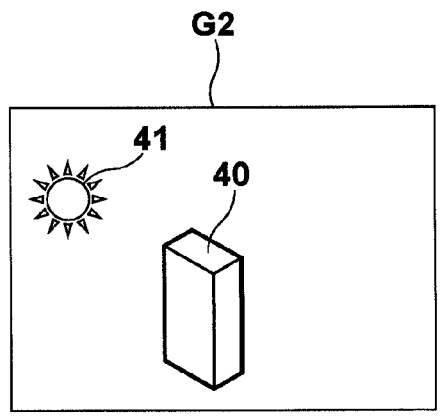

FIG. 3 shows a situation of photography by the imaging units 2A and 2B. As shown in FIG. 3, in the case where a subject 40 is photographed by the imaging units 2A and 2B, assume that a sun 41 is located above the right of the subject 40. In this situation, an image G1 shown in FIG. 4A is obtained by the imaging unit 2A while an image G2 shown in FIG. 4B is obtained by the imaging unit 2B. When the images G1 and G2 are compared to each other, the sun 41 is included in a field angle of the imaging unit 2B. Therefore, the image G2 includes a high luminance region corresponding to the sun 41.

Figure 5:
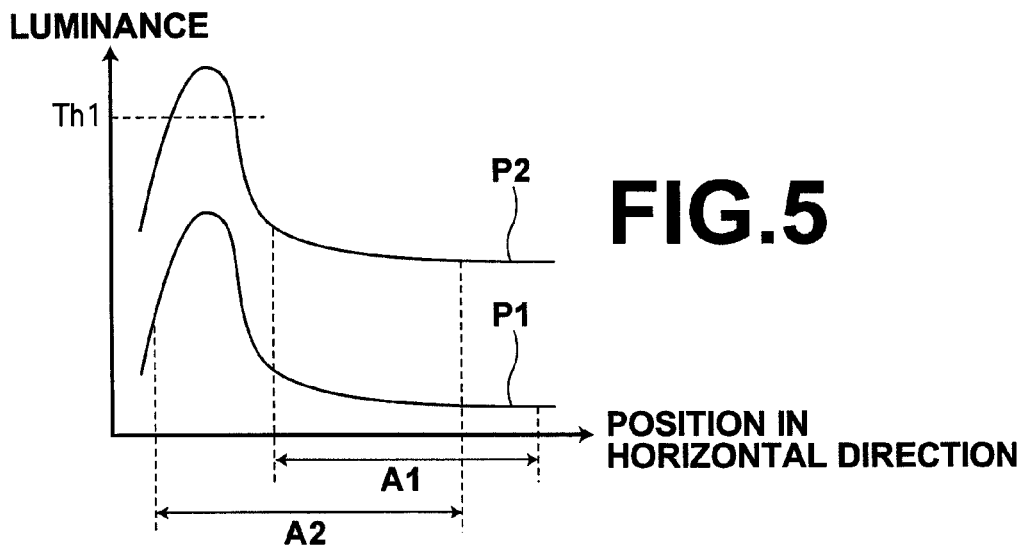
FIG. 5 shows profiles of luminance values in a horizontal direction of the images.

FIG. 5 shows profiles of the luminance values in a horizontal direction of the images G1 and G2. The profiles shown in FIG. 5 correspond to the position of the sun 41 in the image G2. In FIG. 5, A1 refers to a field angle of the imaging unit 2A, and A2 refers to the field angle of the imaging unit 2B. A profile P1 is a profile of the luminance values before setting the exposure while a profile P2 is a profile of the luminance values after the exposure has been set. The imaging unit 2A has obtained the image in a range corresponding to the field angle A1, and the luminance values have become high as shown by the profile P2 as a result of exposure setting by calculation of the exposure value based on the image in the range of field angle A1.

In this case, if the exposure is set for the imaging unit 2B based on the exposure value having been calculated, the luminance values of the image obtained by the imaging unit 2B become high as by the imaging unit 2A. Therefore, a portion of the luminance values corresponding to the sun 41 becomes higher. As a result, the luminance values corresponding to the sun 41 are larger than the threshold value Th1, causing white compression in the image. In this case, the imaging unit 2B is designated as the new main imaging unit in the first embodiment, and the exposure value is calculated based on the image obtained by the new main imaging unit. In this manner, the exposure value that does not cause image saturation as much as possible can be calculated again for the imaging units 2A and 2B.

Figure 6:
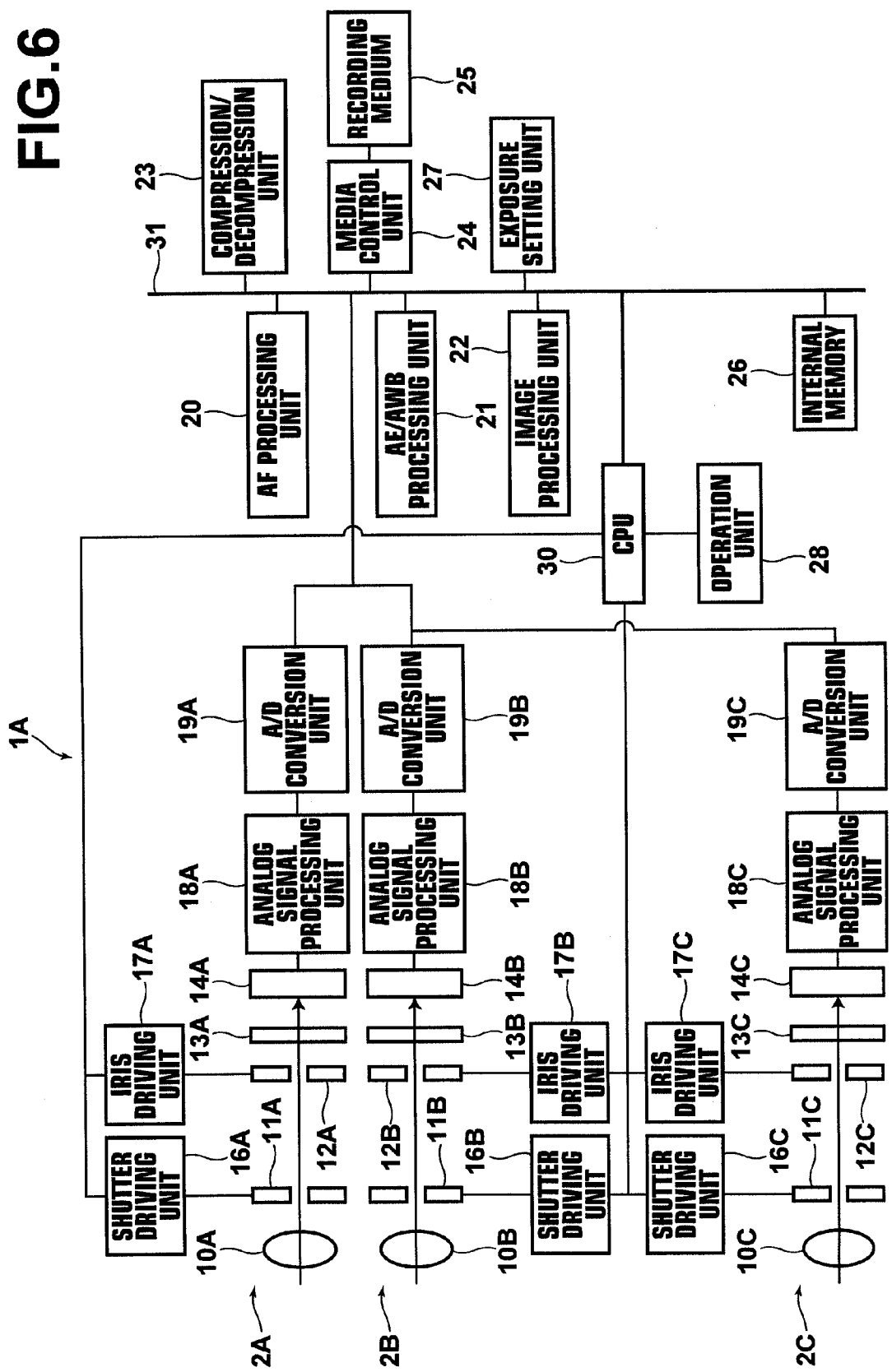
FIG. 6 shows the configuration of a multiple lens imaging apparatus of a second embodiment of the present invention.

A second embodiment of the present invention will be described next. FIG. 6 shows the configuration of a multiple lens imaging apparatus in the second embodiment. In the second embodiment, the same elements as in the first embodiment have the same reference codes, and detailed description thereof will be omitted. A multiple lens imaging apparatus 1A in the second embodiment further comprises a third imaging unit 2C, in addition to the two imaging units 2A and 2B. The exposure setting unit 27 carries out different processing from the processing in the first embodiment.

FIG. 7 is a flow chart showing exposure setting processing in the second embodiment. When a photographer instructs the start of photography by using the operation unit 28, the CPU 30 starts the processing. The exposure setting unit 27 instructs the main imaging unit 2A to obtain the preliminary image, and the main imaging unit 2A obtains the preliminary image (Step ST11). The AE/AWB processing unit 21 carries out the AE processing by using the preliminary image, and calculates the exposure value (Step ST12). The exposure setting unit 27 sets the exposure of the main imaging unit 2A and the sub-imaging units 2B and 2C, based on the calculated exposure value (Step ST13).

The exposure setting unit 27 then instructs the sub-imaging units 2B and 2C whose exposure has been set to obtain the preliminary images, and the sub-imaging units 2B and 2C obtain the preliminary images (Step ST14). The exposure setting unit 27 judges whether the preliminary images are saturated (Step ST15).

If the result of judgment at Step ST15 is affirmative, the exposure setting unit 27 judges whether the number of the saturated preliminary images is larger than one (Step ST16). If the result of judgment at Step ST16 is negative, only one of the preliminary images is saturated. Therefore, the exposure setting unit 27 designates the sub-imaging unit that has obtained the saturated preliminary image as a new main imaging unit (Step ST17), and the processing returns to Step ST11. In this manner, the procedures after Step ST11 are repeated by using the new main imaging unit.

In the case where the result at Step ST16 is affirmative, the exposure setting unit 27 calculates an area of a saturated region in each of the saturated preliminary images (Step ST18), and designates the sub-imaging unit that has obtained the preliminary image having a largest saturated region as the new main imaging unit (Step ST19). The processing then returns to Step ST11.

In the case where the result of the judgment at Step ST15 is negative, the exposure setting unit 27 instructs the imaging units 2A, 2B and 2C to carry out actual photography by setting the exposure according to the exposure value having been calculated. In response, the imaging units 2A, 2B and 2C carry out the actual photography (Step ST20). Three image data sets obtained in the actual photography are recorded in the recording medium 25 (Step ST21) to end the processing.

In the second embodiment, the number of the imaging units is three. However, the processing can be carried out in the same manner for the case where the number of the imaging units is four or more.

A third embodiment of the present invention will be described next. A multiple lens imaging apparatus in the third embodiment has the same configuration as the multiple lens imaging apparatus 1A in the second embodiment, and processing carried out by the exposure setting unit 27 is solely different. Therefore, detailed description of the configuration of the apparatus will be omitted.

FIG. 8 is a flow chart showing exposure setting processing in the third embodiment. When a photographer instructs the start of photography by using the operation unit 28, the CPU 30 starts the processing. The exposure setting unit 27 instructs the main imaging unit 2A to obtain the preliminary image, and the main imaging unit 2A obtains the preliminary image (Step ST31). The AE/AWB processing unit 21 carries out the AE processing by using the preliminary image, and calculates the exposure value (Step ST32). The exposure setting unit 27 sets the exposure of the main imaging unit 2A and the sub-imaging units 2B and 2C, based on the calculated exposure value (Step ST33).

The exposure setting unit 27 then instructs the sub-imaging units 2B and 2C whose exposure has been set to obtain the preliminary images, and the sub-imaging units 2B and 2C obtain the preliminary images (Step ST34). The exposure setting unit 27 judges whether the preliminary images are saturated (Step ST35).

If the result of judgment at Step ST35 is affirmative, the exposure setting unit 27 judges whether the number of the saturated preliminary images is larger than one (Step ST36). If the result of judgment at Step ST36 is negative, only one of the preliminary images is saturated. Therefore, the exposure setting unit 27 designates the sub-imaging unit having obtained the saturated preliminary image as a new main imaging unit (Step ST37), and the processing returns to Step ST31. In this manner, the procedures after Step ST31 are repeated by using the new main imaging unit.

If the result of judgment at Step ST36 is affirmative, the exposure setting unit 27 judges whether the number of the saturated preliminary images including a white compression region is one or larger and whether the number of the saturated preliminary images including a black compression region is one or larger (Step ST38). If results at Step ST38 are both affirmative, the exposure setting unit 27 calculates the exposure value separately for each of the sub-imaging units 2B and 2C (Step ST39). If the results at Step ST38 are not both affirmative, the exposure setting unit 27 calculates an area of each saturated region in the saturated preliminary images (Step ST40), and designates the sub-imaging unit that has obtained the preliminary image having a largest area of saturation as a new main imaging unit (Step ST41). The processing then returns to Step ST31.

Following Step ST39 and in the case where the result at Step ST35 is negative, the exposure setting unit 27 instructs the imaging units 2A to 2C to carry out actual photography by setting the exposure according to the calculated exposure value, and the imaging units 2A to 2C carry out the actual photography (Step ST42). Three image data sets obtained in the actual photography are then recorded in the recording medium 25 (Step ST43) to end the processing.

In the third embodiment, the number of the imaging units is three. However, the processing can be carried out in the same manner for the case where the number of the imaging units is four or more.

Figure 9A:
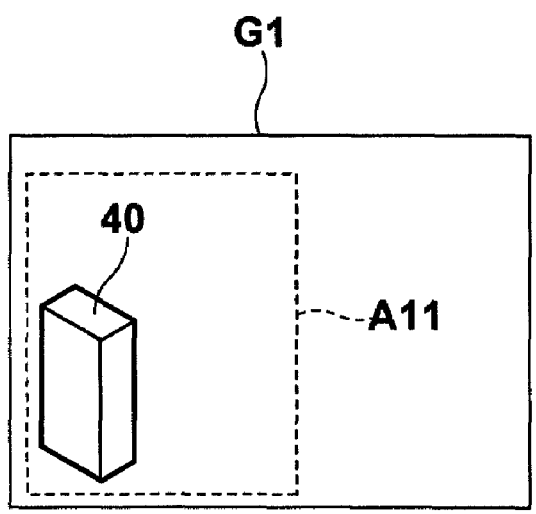
FIGS. 9A and 9B show regions that are common among field angles of imaging units.
Figure 9B:
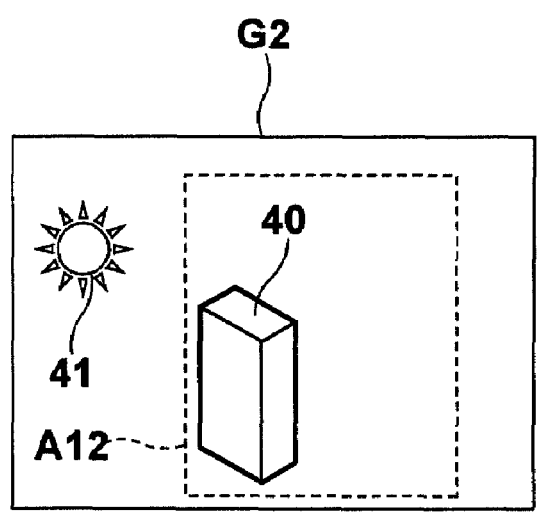

In the case where a stereo image is generated, not the entire regions of respective images obtained by imaging units are used but only regions that are common among field angles of the imaging units are used. In other words, in generation of a stereo image, only the regions that are common among the field angles of the imaging units have to be in appropriate luminance. For example, in the images G1 and G2 shown in FIGS. 4A and 4B, if regions A11 and A12 in the images G1 and G2 are common among the field angles of the imaging units 2A and 2B as shown in FIGS. 9A and 9B, the images have to be in appropriate luminance only in the regions A11 and A12. Therefore, in the case where the saturated region or regions in the preliminary image or images obtained by the sub-imaging unit or units in the first to third embodiments is/are not in the region or regions necessary for generation of a stereo image, the exposure therefor does not need to be set again. Hereinafter, processing in consideration of this fact will be described as a fourth embodiment.

The regions necessary for generation of a stereo image can be calculated based on a method of calculation according to positions and orientations of the imaging units 2A and 2B, or based on a method of calculation according to images obtained in advance by the imaging units 2A and 2B, for example. In the former case, if the imaging units 2A and 2B are controlled in such a manner that the positions and the orientations thereof are movable, the regions necessary for generation of a stereo image may be calculated based on a result of the control. In the latter case, if moving images are photographed especially, each of the regions necessary for generation of a stereo image may be calculated based on an immediately preceding frame.

Figure 10:
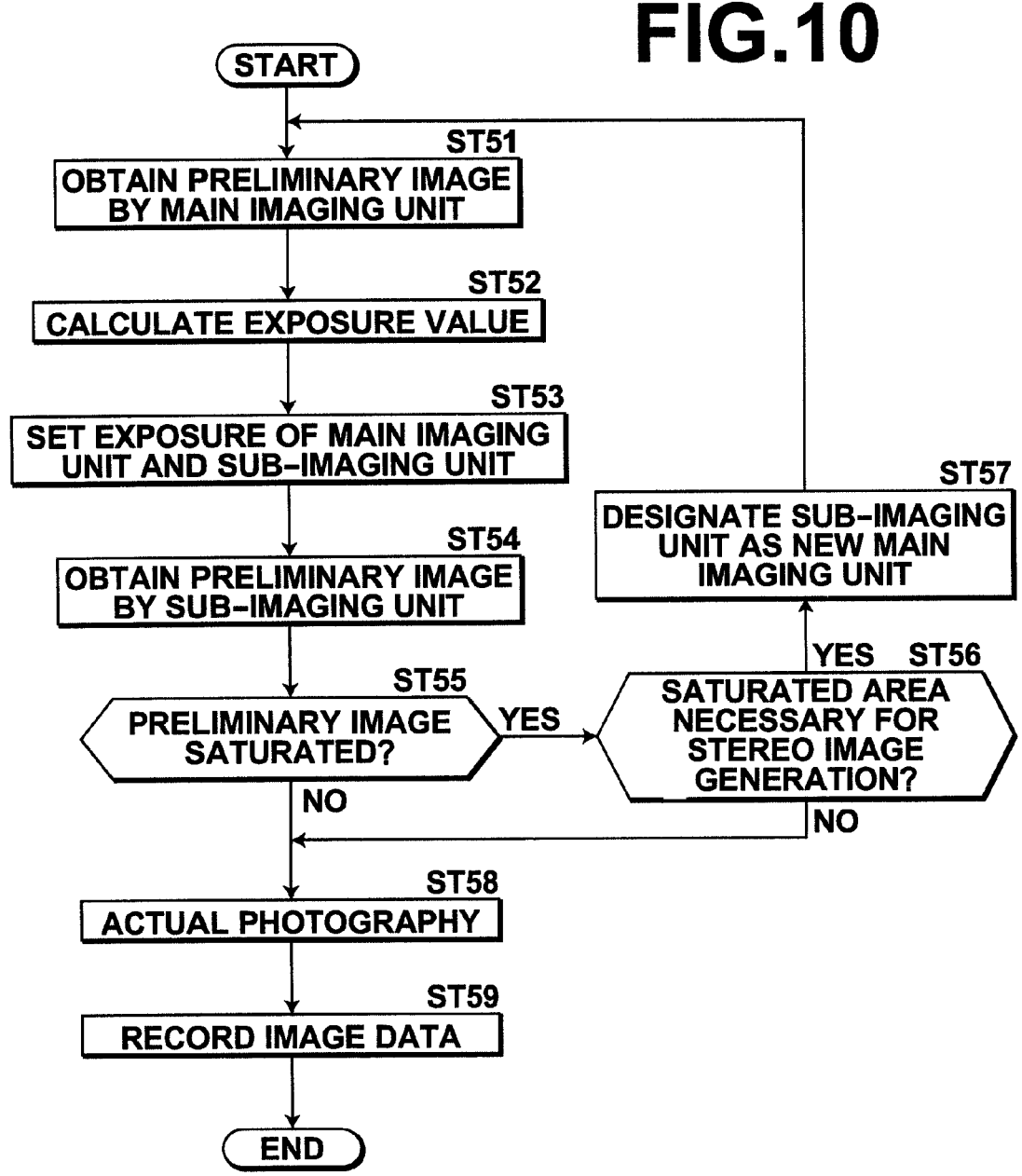
FIG. 10 is a flow chart showing exposure setting processing in a fourth embodiment.

FIG. 10 is a flow chart showing exposure setting processing in the fourth embodiment. The flow chart in FIG. 10 is to judge whether a saturated region in the preliminary image obtained by the sub-imaging unit in the first embodiment is within the region necessary for generation of a stereo image. However, the processing can be applied to the second and third embodiments in the same manner.

When a photographer instructs the start of photography by using the operation unit 28, the CPU 30 starts the processing. The exposure setting unit 27 instructs the main imaging unit 2A to obtain the preliminary image, and the main imaging unit 2A obtains the preliminary image (Step ST51). The AE/AWB processing unit 21 carries out the AE processing by using the preliminary image, and calculates the exposure value (Step ST52). The exposure setting unit 27 sets the exposure of the main imaging unit 2A and the sub-imaging unit 2B, based on the calculated exposure value (Step ST53).

The exposure setting unit 27 then instructs the sub-imaging unit 2B whose exposure has been set to obtain the preliminary image, and the sub-imaging unit 2B obtains the preliminary image (Step ST54). The exposure setting unit 27 judges whether the preliminary image is saturated (Step ST55).

If the result of judgment at Step ST55 is affirmative, the exposure setting unit 27 judges whether a saturated region is in the region necessary for generation of a stereo image (Step ST56). If the result of judgment at Step ST56 is affirmative, the exposure setting unit 27 designates the sub-imaging unit 2B as a new main imaging unit (Step ST57), and the processing returns to Step ST51. In this manner, the procedures from Step ST51 are repeated with the imaging unit 2B designated as the new main imaging unit.

If the results at Steps ST55 and ST56 are negative, the exposure setting unit 27 instructs the imaging units 2A and 2B to carry out actual photography by setting the exposure according to the exposure value having been calculated, and the imaging units 2A and 2B carry out the actual photography (Step ST58). Two image data sets obtained in the actual photography are recorded in the recording medium 25 (Step ST59), to end the processing.

In the fourth embodiment described above, whether the saturated region is in the region necessary for generation of a stereo image is judged in the case of the preliminary image being saturated. However, the regions necessary for generation of a stereo image are predetermined. Therefore, the judgment as to whether the preliminary images in the first to third embodiments are saturated may be carried out only on the regions necessary for generation of a stereo image.

A fifth embodiment of the present invention will be described next. A multiple lens imaging apparatus in the fifth embodiment has the same configuration as the multiple lens imaging apparatus 1 in the first embodiment, and processing by the exposure setting unit 27 is solely different. Therefore, detailed description of the configuration of the apparatus will be omitted. In the case where white compression is observed in the image or images obtained by the sub-imaging unit or units in the first to fourth embodiments described above and the luminance varies greatly between the image obtained by the main imaging unit and the image or images obtained by the sub-imaging unit or units, black compression may be observed in the image or images obtained by the new sub-imaging unit or units if the exposure value is calculated by designating the sub-imaging unit or one of the sub-imaging units as the new main imaging unit. The fifth embodiment is to solve this problem.

Figure 11:
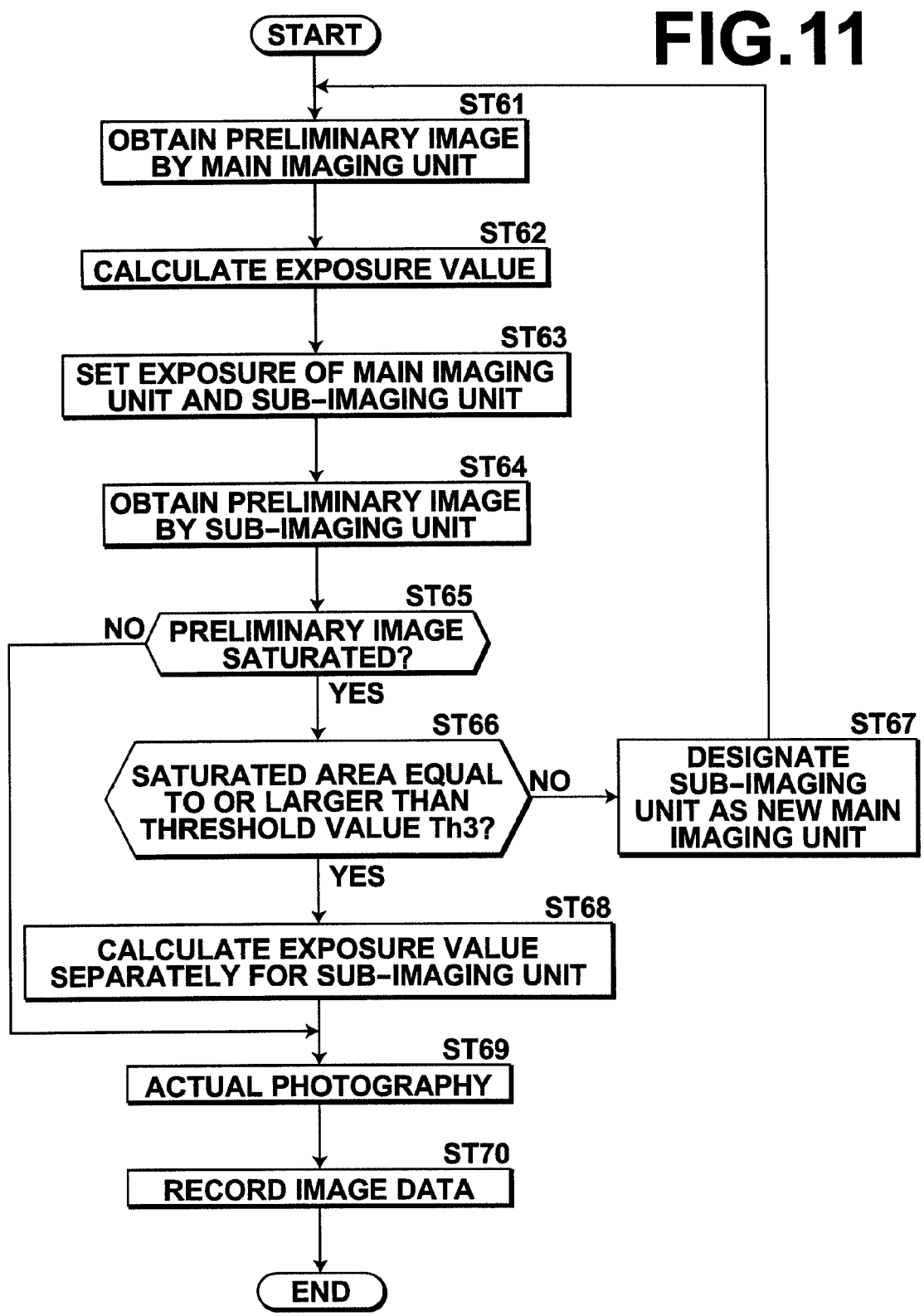
FIG. 11 is a flow chart showing exposure setting processing in a fifth embodiment.

FIG. 11 is a flow chart showing exposure setting processing in the fifth embodiment. When a photographer instructs the start of photography by using the operation unit 28, the CPU 30 starts the processing. The exposure setting unit 27 instructs the main imaging unit 2A to obtain the preliminary image, and the main imaging unit 2A obtains the preliminary image (Step ST61). The AE/AWB processing unit 21 carries out the AE processing by using the preliminary image, and calculates the exposure value (Step ST62). The exposure setting unit 27 sets the exposure of the main imaging unit 2A and the sub-imaging unit 2B, based on the calculated exposure value (Step ST63).

The exposure setting unit 27 then instructs the sub-imaging unit 2B whose exposure has been set to obtain the preliminary image, and the sub-imaging unit 2B obtains the preliminary image (Step ST64). The exposure setting unit 27 judges whether the preliminary image is saturated (Step ST65). At this time, the judgment may be carried out only on the region necessary for generation of a stereo image.

If the result of judgment at Step ST65 is affirmative, the exposure setting unit 27 judges whether an area of a saturated region is a predetermined threshold value Th3 or larger (Step ST66). If the result at Step ST65 is affirmative, the judgment as to whether the saturated region is within the region necessary for generation of a stereo image may be carried out as in the fourth embodiment. If the result of judgment at Step ST66 is negative, the exposure setting unit 27 designates the sub-imaging unit 2B as a new main imaging unit (Step ST67), and the processing returns to Step ST61. In this manner, the procedures from Step ST61 are repeated by using the imaging unit 2B as the new main imaging unit.

If the result at Step ST66 is affirmative, the exposure setting unit 27 calculates the exposure value separately for the sub-imaging unit 2B (Step ST68). In this manner, the exposure can be set so as not to cause saturation in the image obtained by the sub-imaging unit 2B.

After Step ST68 and in the case where the result at Step ST65 is negative, the exposure setting unit 27 instructs the imaging units 2A and 2B to carry out actual photography by setting the exposure according to the exposure value having been calculated. In response, the imaging units 2A and 2B carry out the actual photography (Step ST69). Two image data sets obtained in the actual photography are recorded in the recording medium 25 (Step ST70) to end the processing.

In the case where a stereo image is generated, a center region of an image obtained by each of imaging units is used therefor. Consequently, in the case where the image or images obtained by the sub-imaging unit or units is/are saturated, it is preferable for a method of photometry to be changed to measure a center region of an image with emphasis. Hereinafter, processing in consideration of this point will be described as a sixth embodiment.

Figure 12:
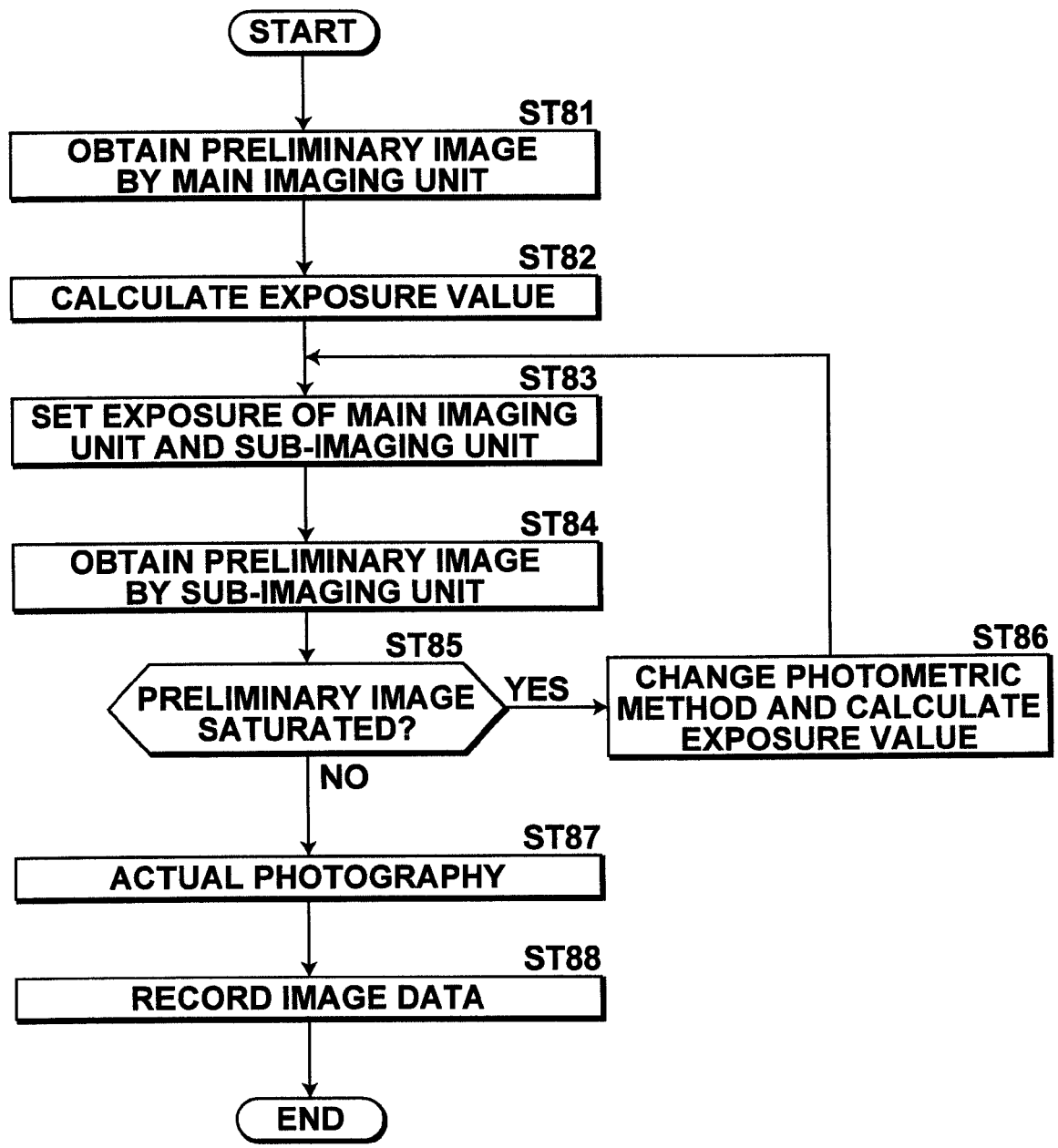
FIG. 12 is a flow chart showing exposure setting processing in a sixth embodiment.

FIG. 12 is a flow chart showing exposure setting processing in the sixth embodiment. The flow chart in FIG. 12 is to change a photometric method in the first embodiment. However, the processing can be applied to the second to fifth embodiments in the same manner.

When a photographer instructs the start of photography by using the operation unit 28, the CPU 30 starts the processing. The exposure setting unit 27 instructs the main imaging unit 2A to obtain the preliminary image, and the main imaging unit 2A obtains the preliminary image (Step ST81). The AE/AWB processing unit 21 carries out the AE processing by using the preliminary image, and calculates the exposure value (Step ST82). The exposure setting unit 27 sets the exposure of the main imaging unit 2A and the sub-imaging unit 2B, based on the calculated exposure value (Step ST83).

The exposure setting unit 27 then instructs the sub-imaging unit 2B whose exposure has been set to obtain the preliminary image, and the sub-imaging unit 2B obtains the preliminary image (Step ST84). The exposure setting unit 27 judges whether the preliminary image is saturated (Step ST85). At this time, the judgment may be carried out only on the region necessary for generation of a stereo image.

If the result of judgment at Step ST85 is affirmative, the exposure setting unit 27 then instructs the main imaging unit 2A and the AE/AWB processing unit 21 to calculate the exposure value by causing the main imaging unit 2A to obtain the preliminary image after changing the photometric method from a method of photometric measurement over the entire image to a method of photometric measurement with emphasis on a center portion thereof, for example (Step ST86). The processing then returns to Step ST83, and the procedures after Step ST83 are repeated. If the result at Step ST85 is affirmative, whether a saturated region is the region used for generation of a stereo image may be judged as in the fourth embodiment.

If the result at Step ST85 is negative, the exposure setting unit 27 instructs the imaging units 2A and 2B to carry out actual photography by setting the exposure according to the calculated exposure value, and the imaging units 2A and 2B carry out the actual photography (Step ST87). Two image data sets obtained in the actual photography are then recorded in the recording medium 25 (Step ST88) to end the processing.

In the sixth embodiment described above, the photometric method is changed for the main imaging unit at Step ST86. However, the exposure setting unit 27 may designate the sub-imaging unit as a new main imaging unit and the photometric method may be changed for the new main imaging unit.

Figure 13:
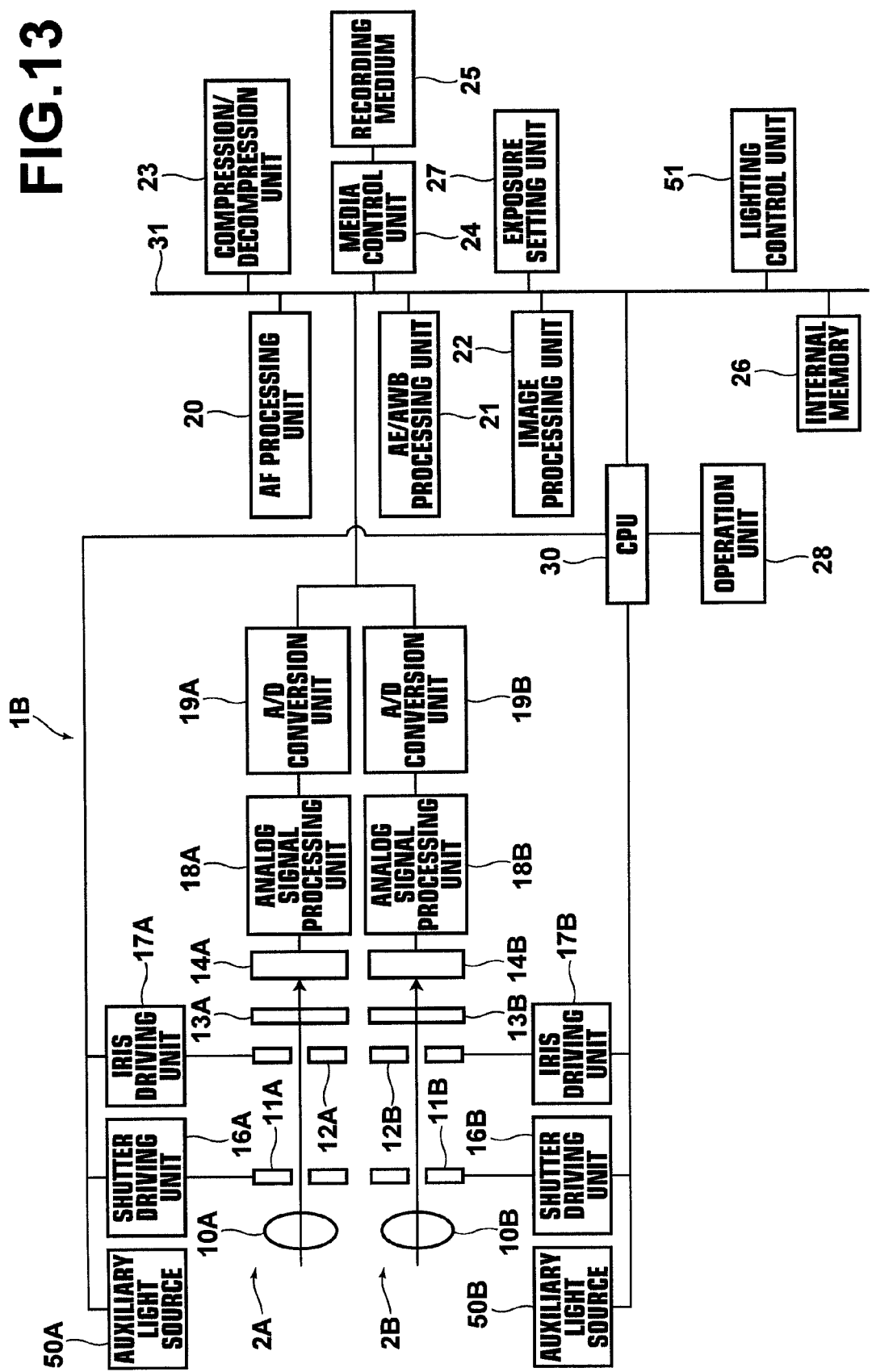
FIG. 13 shows the configuration of a multiple lens imaging apparatus of a seventh embodiment of the present invention.

A seventh embodiment of the present invention will be described next. FIG. 13 shows the configuration of a multiple lens imaging apparatus in the seventh embodiment. In the seventh embodiment, the same elements as in the first embodiment have the same reference codes, and detailed description thereof will be omitted. A multiple lens imaging apparatus 1B in the seventh embodiment is different from the first embodiment in that the imaging units 2A and 2B comprise auxiliary light sources 50A and 50B for emitting auxiliary lights to directions of photography by the imaging units 2A and 2B, and the apparatus comprises a lighting control unit 51 for controlling light emission from the auxiliary light sources 50A and 50B.

The auxiliary light sources may be LEDs, for example. Alternatively, flashes may be used instead of LEDs.

The lighting control unit 51 controls light emission from the auxiliary light sources 50A and 50B, according to whether the preliminary image obtained by the sub-imaging unit 2B is saturated on a high luminance side or on a low luminance side. How the light emission is controlled will be described later.

Figure 14:
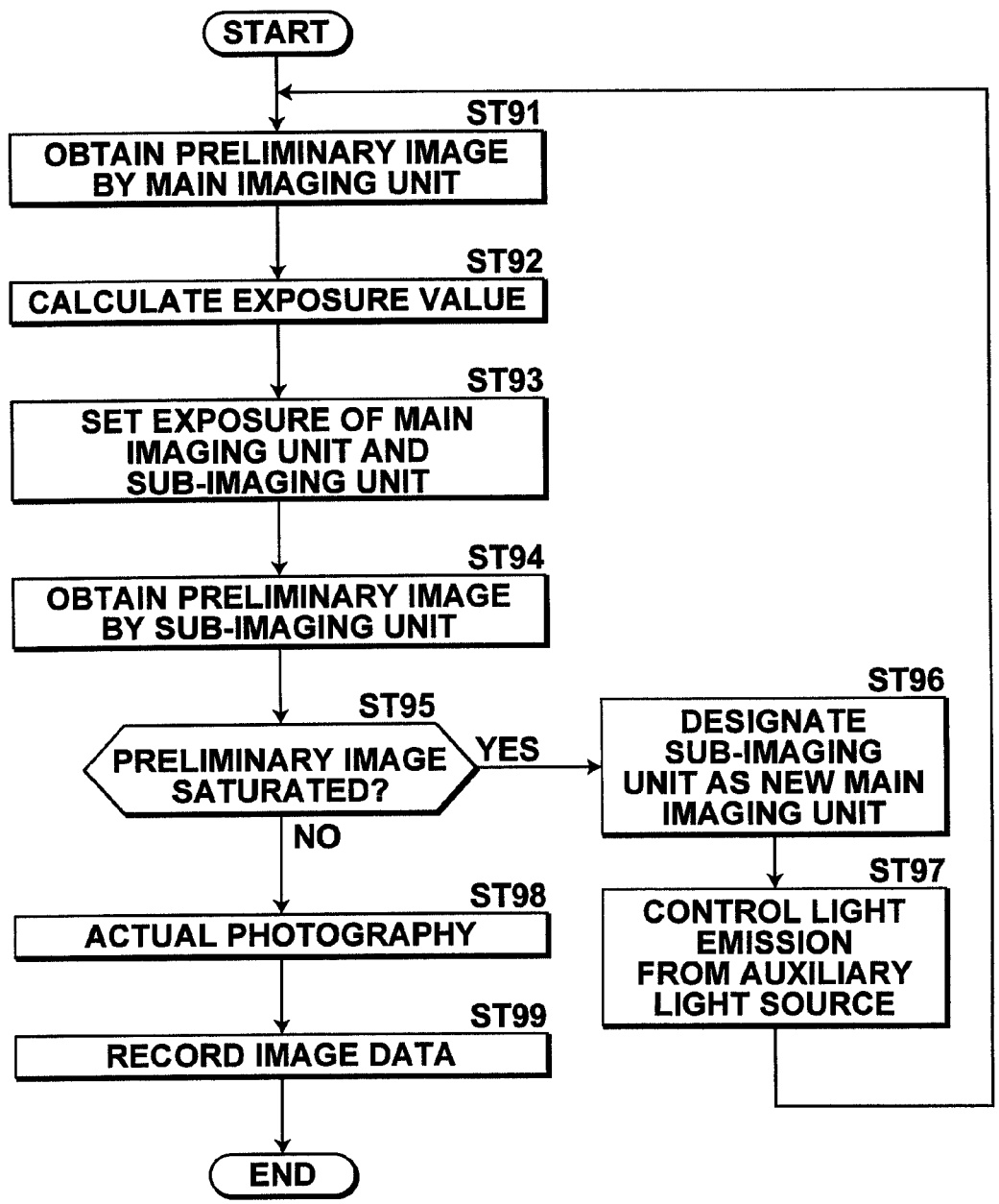
FIG. 14 is a flow chart showing exposure setting processing in the seventh embodiment.

FIG. 14 is a flow chart showing exposure setting processing in the seventh embodiment. When a photographer instructs the start of photography by using the operation unit 28, the CPU 30 starts the processing. The exposure setting unit 27 instructs the main imaging unit 2A to obtain the preliminary image, and the main imaging unit 2A obtains the preliminary image (Step ST91). The AE/AWB processing unit 21 carries out the AE processing by using the preliminary image, and calculates the exposure value (Step ST92). The exposure setting unit 27 sets the exposure of the main imaging unit 2A and the sub-imaging unit 2B, based on the calculated exposure value (Step ST93).

The exposure setting unit 27 then instructs the sub-imaging unit 2B whose exposure has been set to obtain the preliminary image, and the sub-imaging unit 2B obtains the preliminary image (Step ST94). The exposure setting unit 27 judges whether the preliminary image is saturated (Step ST95).

If the result of judgment at Step ST95 is affirmative, the exposure setting unit 27 designates the sub-imaging unit 2B as a new main imaging unit (Step ST96), and the lighting control unit 51 controls the light emission from the auxiliary light sources 50A and 50B according to whether the preliminary image is saturated on the high luminance side or on the low luminance side (Step ST97). The processing then returns to Step ST91. In this manner, the procedures from Step ST91 are repeated by using the imaging unit 2B as the new main imaging unit.

For controlling the light emission from the auxiliary light sources, in the case where the preliminary image obtained by the sub-imaging unit 2B is saturated on the high luminance side and has a white compression region, only the auxiliary light source 50A for the main imaging unit 2A is turned on so that the image obtained by the main imaging unit 2A becomes brighter. In the case the preliminary image obtained by the sub-imaging unit 2B is saturated on the low luminance side and has a black compression region, only the auxiliary light source 50B for the sub-imaging unit 2B is turned on so that the image obtained by the sub-imaging unit 2B becomes brighter.

If the result at Step ST95 is negative, the exposure setting unit 27 instructs the imaging units 2A and 2B to carry out actual photography by setting the exposure according to the exposure value having been calculated, and the imaging units 2A and 2B carry out the actual photography (Step ST98). Two image data sets obtained in the actual photography are then recorded in the recording medium 25 (Step ST99) to end the processing.

In this manner, difference in brightness of the subject can be reduced between the images obtained by the main imaging unit and the sub-imaging unit in the seventh embodiment. Therefore, the exposure can be set easily.

The seventh embodiment can be applied to the case where the number of the imaging units is three or more. In this case, if the preliminary images obtained by the sub-imaging units are saturated on a low luminance side and have black compression regions, all the auxiliary light sources for the sub-imaging units that have obtained the saturated images are turned on.

In the first to seventh embodiments described above, the cases of still image photography have been described. However, the exposure can be set in the same manner for moving images. In this case, the exposure value is calculated for the main imaging unit based on one frame in a moving image, instead of the preliminary image. In the case where one frame obtained by the sub-imaging unit after setting the exposure thereof according to the calculated exposure value is saturated, the same processing as in the first to seventh embodiments is carried out.

In the first to seventh embodiments of the present invention, the imaging unit 2A is predetermined as the main imaging unit. However, in the case where photography is carried out again after the main imaging unit has been changed in the immediately preceding photography, the exposure may be set by designating as the main imaging unit the imaging unit having been designated as the main imaging unit in the immediately preceding photography.

Although the multiple lens imaging apparatuses related to the embodiments of the present invention have been described above, programs that cause a computer to function as means corresponding to the exposure setting unit 27 and to execute the processing shown in FIGS. 2, 7, 8, 10, 11, 12 and 14 are also embodiments of the present invention. In addition, computer-readable recording media storing such programs are also embodiments of the present invention.

Note that the program of the present invention may be provided being recorded on a computer readable medium. Those who are skilled in the art would know that computer readable media are not limited to any specific type of device, and include, but are not limited to: CD's, RAM's ROM's, hard disks, magnetic tapes, and internet downloads, in which computer instructions can be stored and/or transmitted. Transmission of the computer instructions through a network or through wireless transmission means is also within the scope of this invention. Additionally, the computer instructions include, but are not limited to: source, object, and executable code, and can be in any language, including higher level languages, assembly language, and machine language.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A multiple lens imaging apparatus comprising:
 a plurality of imaging unit for obtaining images by photography; and
 exposure setting unit for using an exposure value calculated according to a result of photometric measurement for predetermined main imaging unit among the plurality of imaging unit, to set exposure of the main imaging unit and sub-imaging unit other than the main imaging unit, wherein,
 in the case where an image or images obtained in photography with the sub-imaging unit by setting the exposure thereof according to the exposure value is/are saturated, the exposure setting unit designates any one of the sub-imaging unit having obtained the saturated image or images as new main imaging unit, and newly calculates the exposure value and sets the exposure of the new main imaging unit and new sub-imaging unit other than the new main imaging unit.

2. The multiple lens imaging apparatus according to claim 1, wherein,
 in the case where the number of the sub-imaging unit having obtained the saturated image or images is one, the exposure setting unit designates the sub-imaging unit as the new main imaging unit.

3. The multiple lens imaging apparatus according to claim 1, wherein,
 in the case where the number of the sub-imaging unit having obtained the saturated image or images is larger than one, the exposure setting unit designates the sub-imaging unit having obtained the image with a largest saturated region therein as the new main imaging unit.

4. The multiple lens imaging apparatus according to claim 1, wherein
 the exposure setting unit carries out judgment as to whether a saturated region in each of the images obtained by the plurality of imaging unit is within a predetermined region therein, and,
 in the case where a result of the judgment is affirmative, the exposure setting unit judges that the corresponding image is saturated.

5. The multiple lens imaging apparatus according to claim 1, wherein,
 the exposure setting unit carries out the judgment as to whether the image or images is/are saturated, in a predetermined region in each of the images obtained by the plurality of imaging unit.

6. The multiple lens imaging apparatus according to claim 1, the apparatus comprising:
 a plurality of auxiliary light sources corresponding respectively to the plurality of imaging unit for emitting auxiliary lights to directions of photography by the corresponding imaging unit; and the apparatus further comprising:
 lighting control unit for controlling, in the case where the image or images obtained in photography with the sub-imaging unit by setting the exposure thereof according to the exposure value is/are saturated, lighting on and off the auxiliary light sources depending on whether the image or each of the images is saturated on a high luminance side or on a low luminance side.

7. An exposure setting method for a multiple lens imaging apparatus having a plurality of imaging unit for obtaining images by photography, the method comprising the steps of:
 carrying out judgment, at the time of using an exposure value calculated according to a result of photometric measurement for predetermined main imaging unit among the plurality of imaging unit to set exposure of the main imaging unit and sub-imaging unit other than the main imaging unit, as to whether an image or images obtained in photography with the sub-imaging unit by setting the exposure thereof according to the exposure value is/are saturated;
 designating, in the case where a result of the judgment is affirmative, any one of the sub-imaging unit having obtained the saturated image or images as new main imaging unit; and
 newly carrying out calculation of the exposure value and setting of the exposure of the new main imaging unit and new sub-imaging unit other than the new main imaging unit.

8. An exposure setting method for a multiple lens imaging apparatus having a plurality of imaging unit for obtaining images by photography, the method comprising the steps of:
 carrying out judgment, at the time of using an exposure value calculated from a result of photometric measurement according to a predetermined photometric method for predetermined main imaging unit among the plurality of imaging unit to set exposure of the main imaging unit and sub-imaging unit other than the main imaging unit, as to whether an image or images obtained in photography with the sub-imaging unit by setting the exposure thereof according to the exposure value is/are saturated; and
 designating, in the case where a result of the judgment is affirmative, any one of the sub-imaging unit having obtained the saturated image or images as new main imaging unit and calculating a new exposure value based on a result of photometric measurement for the new main imaging unit according to a photometric method different from the predetermined photometric method.

9. A non-transitory computer-readable recording medium storing a program causing a computer to execute an exposure setting method for a multiple lens imaging apparatus having a plurality of imaging unit for obtaining images by photography, the program comprising the procedures of:
 carrying out judgment, at the time of using an exposure value calculated according to a result of photometric measurement for predetermined main imaging unit among the plurality of imaging unit to set exposure of the main imaging unit and sub-imaging unit other than the main imaging unit, as to whether an image or images obtained in photography with the sub-imaging unit by setting the exposure thereof according to the exposure value is/are saturated;
 designating, in the case where a result of the judgment is affirmative, any one of the sub-imaging unit having obtained the saturated image or images as new main imaging unit; and
 newly carrying out calculation of the exposure value and setting of the exposure of the new main imaging unit and new sub-imaging unit other than the new main imaging unit.

10. A non-transitory computer-readable recording medium storing a program causing a computer to execute an exposure setting method for a multiple lens imaging apparatus having a plurality of imaging unit for obtaining images by photography, the program comprising the procedures of: carrying out judgment, at the time of using an exposure value calculated from a result of photometric measurement according to a predetermined photometric method for predetermined main imaging unit among the plurality of imaging unit to set exposure of the main imaging unit and sub-imaging unit other than the main imaging unit, as to whether an image or images obtained in photography with the sub-imaging unit by setting the exposure thereof according to the exposure value is/are saturated; and designating, in the case where a result of the judgment is affirmative, any one of the sub-imaging unit having obtained the saturated image or images as new main imaging unit and calculating a new exposure value based on a result of photometric measurement for the new main imaging unit according to a photometric method different from the predetermined photometric method.

* * * * *